United States Patent [19]
Vincent

[11] 3,800,595
[45] Apr. 2, 1974

[54] SAMPLE EXTRACTION METHOD AND APPARATUS

[75] Inventor: Arthur Leonard Vincent, Monrovia, Calif.

[73] Assignee: International Telephone and Telegraph Corporation, New York, N.Y.

[22] Filed: Mar. 8, 1972

[21] Appl. No.: 232,716

[52] U.S. Cl. ............................... 73/19, 73/421.5 R
[51] Int. Cl. ............................................. G01n 1/22
[58] Field of Search ........ 73/19, 421.5 R; 23/230 R, 23/253

[56] References Cited
UNITED STATES PATENTS

| 3,150,516 | 9/1964 | Linnenbom | 73/19 |
| 3,247,721 | 4/1966 | Johnson | 73/425.4 |
| 3,455,144 | 7/1969 | Bradley | 73/19 |

FOREIGN PATENTS OR APPLICATIONS

| 600,238 | 7/1934 | Germany | 73/19 |

*Primary Examiner*—S. Clement Swisher
*Attorney, Agent, or Firm*—A. Donald Stolzy

[57] ABSTRACT

A system for monitoring votitile compounds such as $H_2S$ in sewage liquids. A probe capable of being floated in the liquid is provided with means for bubbling pure air through the liquid and means for collecting the bubbled air. The air, having picked up the votitile compounds is passed to a coulometric titrator for monitoring purposes.

22 Claims, 3 Drawing Figures

SAMPLE EXTRACTION METHOD AND APPARATUS

BACKGROUND OF THE INVENTION

This invention relates to the art of monitoring chemical concentrations, and more particularly, to methods of and equipment for monitoring the concentration of a constituent in a substantially motionless or flowing liquid which may or may not contain suspended precipitated solids.

The invention will be found to have considerable utility in many applications not disclosed herein. The invention is, therefore, not limited to those applications so disclosed. However, the invention has been found to possess substantial utility in monitoring hydrogen sulfide ($H_2S$) and other volatile sulfur compounds found in raw sewage.

The need to monitor sulfur compounds in sewage exists because incoming sewage at a sewage disposal plant can give off strong odors. This is especially true when sulfur compounds exist in the sewage. If $H_2S$ is monitored, sewage disposal plant personnel are alerted so that certain known methods may be used to reduce air pollution and/or corrosion. For example, chlorination may be employed.

Unfortunately, no prior art continuous method or apparatus is adequate to monitor sulfur compounds in raw sewage.

SUMMARY OF THE INVENTION

In accordance with the present invention, the above-described and other problems of the prior art are overcome by bubbling a gas through a probe.

The gas may be ambient air.

According to one feature of the invention, the probe floats. This has overcome a serious problem of probe stability. For example, in sewage systems, the incoming raw sewage typically travels at a high velocity. It is, thus, very difficult to mechanically stabilize a probe that sinks. The floating probe overcomes this problem.

According to still another feature of the invention, the probe is floated on the bubbled air.

According to a further feature of the invention, the probe is made primarily of a lightweight material such as, for example, polyethylene. The probe is maintained in an approximately vertical upright position by a balance weight made of a heavier material such as, for example, stainless steel.

According to yet another feature of the invention, bubbled air is withdrawn from the probe by an aspirator that is operated by the selfsame pump that supplied fresh air to the probe. Needle valves or other adjustable valves may be employed to vary fluid flow rates.

According to still another feature of the invention, the bubbled air is withdrawn from the probe at a rate less than that at which the fresh air is supplied thereto. The excess of fresh air over the bubbled air withdrawn causes the probe to float in a stable manner through a special probe construction.

It is an advantage of the invention that the fresh air picks up a portion of the $H_2S$ in the sewage. The portion picked up in this manner may, thus, be measured through the use of a conventional coulometric titrator such as that disclosed in U. S. Pat. No. 3,448,031.

The above-described and other advantages of the present invention will be better understood from the following detailed description when considered in connection with the accompanying drawings.

DESCRIPTION OF THE DRAWINGS

In the drawings which are to be regarded as merely illustrative.

DESCRIPTION OF THE PREFERRED EMBODIMENT

Figure 1:
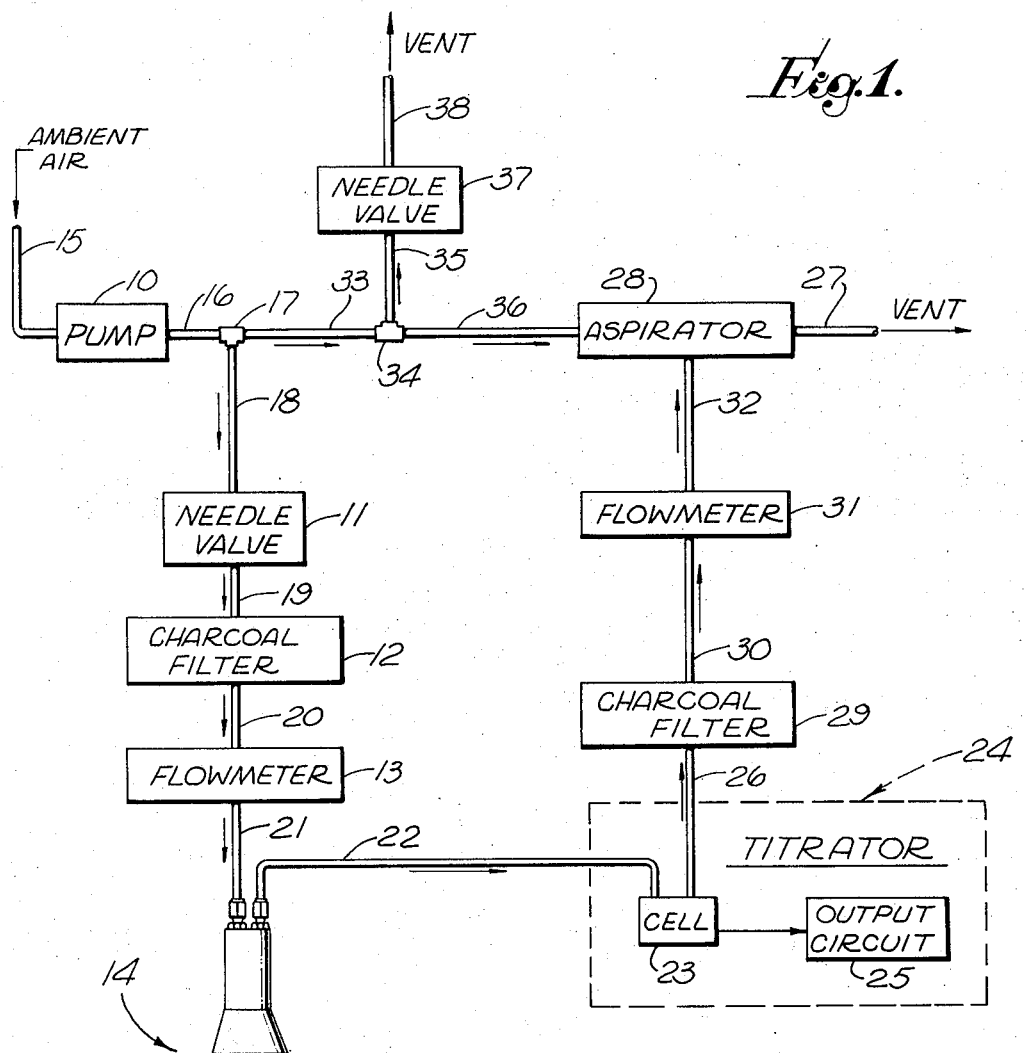
FIG. 1 is a block diagram of a sampling and monitoring system including a scale elevational view of a sewage probe.

In the drawings, in FIG. 1, a pump 10, a needle valve 11, a charcoal filter 12 and a flowmeter 13 are connected in succession to a sewage probe 14. Probe 14 will be described in greater detail hereinafter. Pump 10 is provided with an inlet pipe 15 which is open at its upper end, as viewed in FIG. 1. Pump 10 pumps ambient air received through the said open end of pipe 15 through a pipe 16, a pipe T 17 and a pipe 18 to needle valve 11. Needle valve 11 and charcoal filter 12 are connected by a pipe 19. Charcoal filter 12 and flowmeter 13 are connected by a pipe 20. A pipe 21 connects flowmeter 13 to probe 14. Pump 10, thus, pumps fresh air to probe 14 from pipe 18 through needle valve 11, pipe 19, charcoal filter 12, pipe 20, flowmeter 13 and pipe 21. Air having $H_2S$ entrained therein is pumped from probe 14 through a pipe 22 which is connected from probe 14 to the electrolytic cell 23 of a coulometric titrator 24. Titrator 24 has an output circuit 25 connected from cell 23. Titrator 24 may, for example, be identical to that disclosed in said patent.

The gases, which are passed through cell 23 via pipe 22, are subsequently withdrawn therefrom through a pipe 26 to the right open end of a pipe 27 connected from an aspirator 28 to the atmosphere. Gases in pipe 26 flow through a charcoal filter 29 connected therefrom to a pipe 30. The gas output of pipe 30 is then drawn through a flowmeter 31 connected therefrom and through a pipe 32 connected from flowmeter 31 to aspirator 28. A pipe 33 is connected from pipe T 17 to a pipe T 34. Pipes 35 and 36 are connected from pipe T 34 to a needle valve 37 and aspirator 28, respectively. A pipe 38 is connected from needle valve 37. The upper end of pipe 38, as viewed in FIG. 1, is open and vented to the atmosphere.

Aspirator 28 may be entirely conventional. Pipe 36 provides a pressure inlet to aspirator 28. Pipe 32 provides a vacuum inlet to aspirator 28. Pipe 27 provides the outlet of aspirator 28. Thus, air under pressure passing through aspirator 28 from pipe 36 causes the pressure in pipe 32 to drop below the pressure in pipe 22. All the gases flowing to the aspirator 28 through pipes 32 and 36 are then vented to the atmosphere through pipe 27.

Both needle valves 11 and 37 are adjustable to control the fresh air flow rate in pipe 21 and to control the flow rate of the gases in pipe 22.

If the capacity of the pump 10 is fairly high and the restrictions in needle valves 11 and 37 are fairly small, needle valve 11 will then generally control the fresh air flow rate in pipe 21, and needle valve 37 will control the flow rate of the gases in pipe 22.

OPERATION

In the operation of the embodiment shown in FIG. 1, pump 10 pumps air through needle valve 11, charcoal filter 12 and flowmeter 13 to sewage probe 14. Air is then bubbled through sewage and the air bubbled therethrough, including entrained gases, is pumped from probe 14 through pipe 22 by aspirator 28. In doing so, the gases in pipe 22 are passed successively through cell 23, charcoal filter 29 and flowmeter 31. These gases are then vented to the atmosphere through pipe 27 after they have passed through aspirator 28 with the air supplied thereto through pipe 36, the air supplied to aspirator 28 through pipe 36 also being vented to the atmosphere through pipe 27.

All the while, titrator 24 produces an output for control indication or other purposes. The output or indication is then directly proportional to the content of the $H_2S$ in the gas mixture flowing through piep 22.

Figure 2:
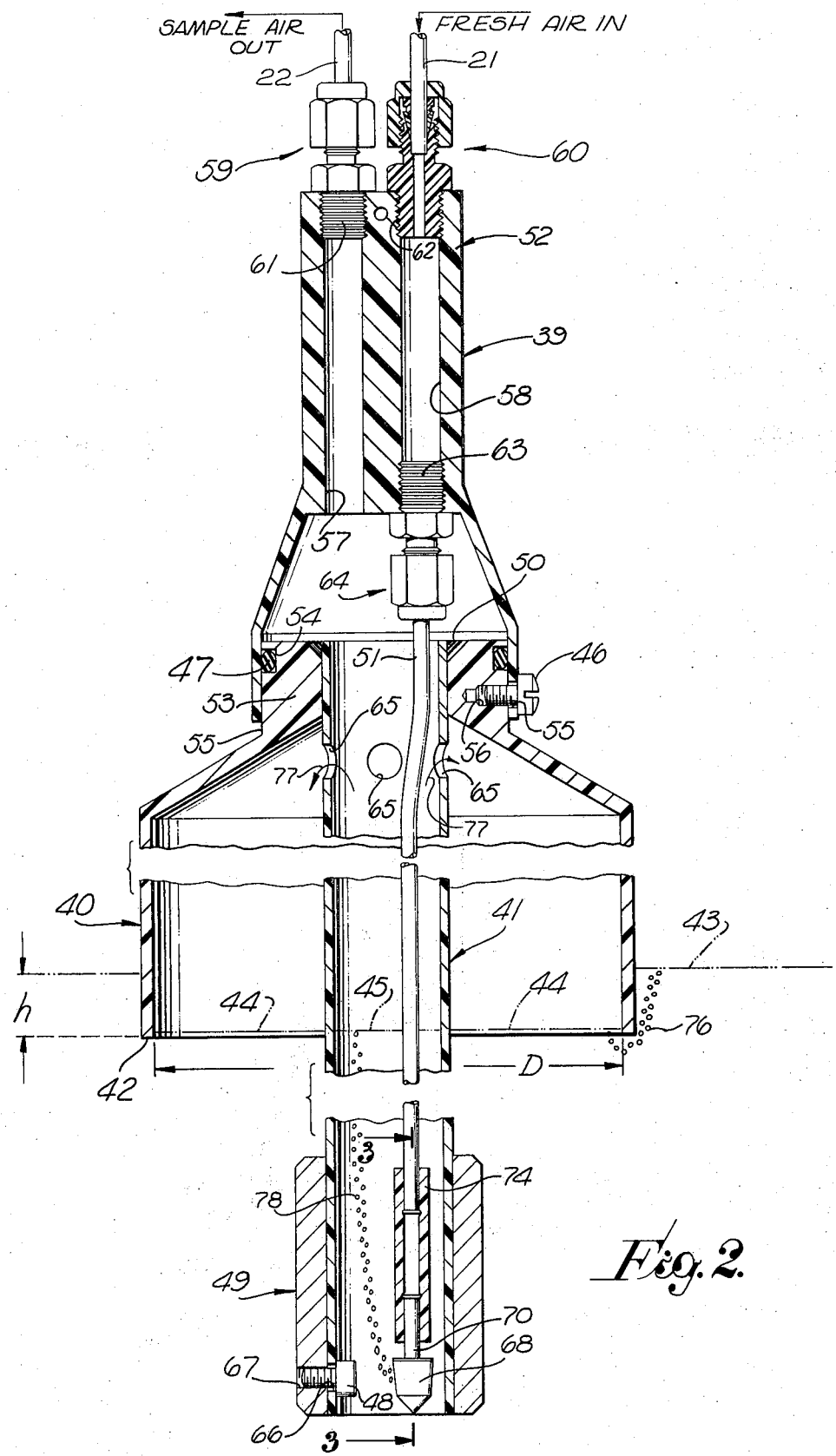
FIG. 2 is a vertical sectional view, partly in elevation, through the probe.

Probe 14 is again shown in FIG. 2 including a bonnet assembly 39, an outer tube or jacket 40 and an inner tube 42. 9

Outer tube 40 has an open lower end and a substantially circular lower edge 42 which will float somewhat below the water or sewage level 43, as indicated in FIG. 2. The water or sewage level inside outer tube 40 may be as indicated at 44. The water or sewage level inside inner tube 41 may be as indicated at 45.

According to Archimedes Law, the difference in the heights of the water levels at 43 and 44, $h$, is given approximately as follows:

$h \approx 4W/\pi D^2 d$ where, $W$ is the weight of probe 14, $\pi$ is an equal to 3.1416, $D$ is the inside diameter of outer tube 40, and $d$ is the density of the water or sewage on which probe 14 floats.

In FIG. 2, both pipes 21 and 22 are again shown.

As shown in FIG. 2, pipes 21, 22 and 51 are each fixed at one end thereof to bonnet assembly 39. Bonnet assembly 39 includes a member 52 which is slidable over an upwardly extending projection 53 of outer tube 40. Projection 53 has an annular groove 54 in the outer cylindrical surface thereof at 55 which carries an O-ring 47 to provide a gas tight seal between projection 53 and member 52. Member 52 is locked in place by three screws 46, one of which is shown in FIG. 2. The three screws are disposed around projection 53 and are equally spaced 120 degrees apart. Each of the screws extends through a corresponding hole 55 through member 52 and is threaded into a corresponding bore 56 in projection 53.

Member 52 has two holes 57 and 58 therethrough. Fittings 59 and 60 are threaded into the upper ends of holes 57 and 58, respectively. Fittings 59 and 60 have threaded ends 61 and 62, respectively, on which pipe compound may be provided to provide a fluid tight seal between fitting ends 61 and 62, and holes 57 and 58, respectively. The same is true of an end 63 of a fitting 64 threaded into the lower end of hole 58. All of the fittings 59, 60 and 64 may be identical. Fitting 59 provides a gas tight connection between the interior of pipe 22 and the interior of hole 57. Similarly, fitting 60 provides a gas tight connection between the interior of pipe 21 and hole 58. Fitting 64 provides a gas tight connection between the interior of hole 58 and pipe 51. All of the fittings 59, 60 and 64 are entirely conventional.

The upper end of inner tube 41 is welded to the upper end of projection 53 at 50.

Inner tube 41 has four holes 65 providing free and open communication from the interior thereof to the space between inner tube 41 and outer tube 40. Holes 65 are equally spaced around inner tube 41 90° apart.

Figure 3:
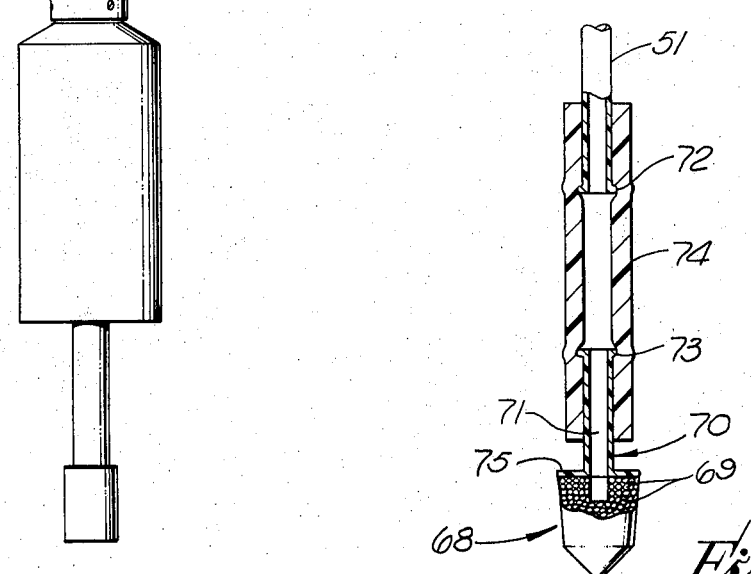
FIG. 3 is a sectional view of a portion of the sewage probe taken on the line 3—3, shown in FIG. 2.

A balance weight 49 is slidable onto the cylindrical external surface of inner tube 41 and locked in position there by three screws 48, only one of which is shown in FIG. 2. The screws 48 are equally spaced around the lower end of inner tube 41 120° apart. Each screw 48 extends through a corresponding hole 66 in inner tube 41, and is threaded into a corresponding hole 67 in balance weight 49. A bubbler 68 is maintained in a fixed position relative to the lower end of pipe 51. For example, as shown in FIG. 3, bubbler 68, which is entirely conventional, includes frit glass granules 69 which are poured in a mold and heated until they are tacked together. Thus, fresh air entering pipe 70 through the interior 71 thereof can pass in between granules 69 and escape upwardly in inner tube 41, as shown in FIG. 2.

In FIG. 3, pipe 51 has a radial flange 72 on its lower end. Similarly, pipe 70 has a radial flange 73 at its upper end. Tubing 74 is slidable over the cylindrical external surface of pipe 51 and flange 72 to the position shown. Flange 72, thus, holds pipe 51 and tubing 74 in substantially fixed positions relative to each other, as shown in FIG. 3. Similarly, flange 73 holds tubing 74 and pipe 70 in fixed positions relative to each other also as shown in FIG. 3.

Pipe 70, at its lower end, is provided with a flange 75 which is bonded to an upper annular area on top of granules 69 and sealed thereto thereat.

All of the structures shown in FIG. 2 may be made of polyethylene except O-ring 47, screws 46 and 48 and balance weight 49. If desired, screws 46 and 48 may be conventional metal screws. The O-ring 47 may be conventional and may be made of rubber, if desired.

Balance weight 49 may be made of 316 stainless steel, if desired.

In the operation of the probe 14 shown in FIG. 2, fresh air is supplied through pipe 21 and flows downwardly through fitting 60, hole 58, fitting 64, pipe 51, tubing 74, pipe 70 and bubbler 68. The fresh air which emanates from bubbler 68 then rises in the sewage inside inner tube 41 to the level 45 and then continues upwardly in inner tube 41. From this point, it either flows upwardly through hole 57, fitting 59 and pipe 22; or it flows through holes 65 in inner tube 41. Needle valves 11 and 37 are adjusted so that air and other gases entrained therewith exits through pipe 22 at a volume flow rate less than the volume flow rate of gases flowing from sewage level position 45 upwardly inside inner tube 41. This means that some of these gases are forced out of holes 65 and occupy the space between outer and inner tubes 40 and 41, respectively, above the sewage level 44. The space inside outer tube 40 outside of inner tube 41 is, thus, filled with gas to float probe 14. A gas flow then exists from the interior of outer tube 40 to the exterior thereof which may be approximately equal to the difference between the volume flow rates of the gases in pipes 21 and 22. This is indicated by bubbles 76.

Gas flow from bubbler 68 to sewage level 45 is indicated by bubbles 78.

In FIG. 1, pump 10, needle valves 11 and 37, charcoal filters 12 and 29 and flowmeters 13 and 31 may be entirely conventional, if desired.

If desired, substitute weights may be employed for balance weight 49 to cause outer tube 40 to sink below the sewage level to any desired depth.

It is an advantage of the probe 14 of the present invention that the lines thereof do not become plugged nor is foaming a problem.

Still another advantage of the invention is that, with proper settings, titrator 24 can indicate the concentration of $H_2S$ in raw sewage. To obtain quantitative values of $H_2S$ present in the sewqge, the titrator must be calibrated against a standard hand method for determining $H_2S$ in wastewater.

Still another advantage of the invention resides in the sewage circulation produced by bubbling air from bubbler 68 to sewage level 45. This causes sewage circulation into and out of inner tube 41 in the manner that water circulation is accomplished in conventional aquariums.

Another outstanding advantage of the float probe 14 of the present invention is that the sewage level 45 inside inner tube 41 remains substantially constant and independent of the magnitude of the sewage level 43. This is a substantial advantage because, if a stationary probe were used, uniform gas flow is made impossible. There are also other disadvantages to the use of a stationary probe. For example, under the circumstances described hereinbefore, accurate readings are impossible. Still further, raw sewage often arrives at a considerable velocity which causes a rapid change in the elevation head thereof.

Note will be taken that outer tube 40 performs at least two functions. In the first place, it permits the rise of the sewage to the level 45 inside tube 41. If outer tube 40 were not provided, any difference in the volume flow rates in pipes 21 and 22 would either cause most of the sewage to leave inner tube 41, or cause the sewage to rise in tube 41 and plug up either one or both of pipes 21 and 22.

Outer tube 40 also provides means to float the entire construction of probe 14 near the sewage level 43. Plugging can be caused by the sewage actually rising. It can also be caused from frothing.

Another outstanding advantage of the present invention is that it is unnecessary to pump any sewage.

Gas flow from the interior of inner tube 41 below holes 65 and through holes 65 into the space between the outer and inner tubes 40 and 41, respectively, is indicated by arrows 77 in FIG. 2.

If the flow rate of the sewage on which probe 14 is floated is high, probe 14 can float with its substantially symmetrical axis disposed a fairly large number of degrees from the vertical without sinking. Moreover, when the probe axis is disposed at such an angle, the system of FIG. 1 will still operate satisfactorily.

A difficulty may be encountered if the system as pictured in FIG. 1 is used. There is a possibility of the flow of the air to the probe dropping below the flow of air from the probe. Under these circumstances, the aspirator may draw water into the titrator cell. Practically, this can be circumvented by locating the cell at least five feet above the water level. Five feet is the water head that the aspirator is capable of drawing. Alternatively, some liquid sensing device, such as a conductivity monitor, could be used to sense the presence of liquid in the line between the probe and the cell and automatically turn off the pump.

What is claimed is:

1. A probe comprising: an inner tube assembly including a first hollow elongated body; a bonnet assembly; a second hollow body mounted in a fixed position relative to said first body surrounding said first body, said bodies both being open at both ends thereof, the upper ends of said bodies, however, being sealed off by said bonnet assembly except for inlet and outlet openings through said bonnet assembly; a bubbler; a conduit assembly connecting said inlet opening with said bubbler, said conduit assembly having its upper end fixed to said bonnet assembly in a position to support said bubbler adjacent the lower open end of said first body; and passage means interconnecting the interiors of said bodies at the upper ends thereof, said second body having a shape and a volume inside thereof which is sufficiently large to cause said bodies, said bonnet assembly, said bubbler and said conduit to float upright on a liquid when said volume is at least partially filled with a gas, said first body having its lower end projecting downwardly beyond the lower end of said second body, said inner tube assembly serving the dual purpose of providing a conduit for gas pumped downwardly through said conduit and out said bubbler and of providing a counterweight of a magnitude sufficiently large and having a center of gravity sufficiently low to hold said bonnet assembly and all structures fixed relative thereto in an upright position.

2. The invention as defined in claim 1, wherein said bodies are spaced concentric hollow cylinders.

3. The invention as defined in claim 2, wherein said second body has a symmetrical axis, the lower edge of said second body being a circle lying in a plane normal to said axis.

4. The invention as defined in claim 3, wherein said inner tube assembly includes a balance weight fixed to said first body at the lower end thereof, said balance weight being made of a material having a density substantially greater than that of at least one of the other structures fixed relative thereto.

5. The invention as defined in claim 4, wherein said bonnet assembly and said first and second bodies are made of a material having a density substantially less than that of said balance weight.

6. The invention as defined in claim 5, wherein said balance weight is a hollow metal cylinder fixed around and concentric with said first body, said bonnet assembly and said first and second bodies being made of a plastic material, said gas being air, a substantial portion of said liquid being water, said second body having a shorter upper portion jointed to a longer lower portion by a frusto-conical flange, said upper portion having an external annular groove, said bonnet assembly being slidable over said upper portion past said groove, an O-ring in said groove to provide a substantially gas tight seal between said bonnet assembly and said second body, means to prevent relative movement between said bonnet assembly and said second body, said bonnet assembly being substantially gas tight except for two holes therethrough, said conduit assembly being sealed to one of said holes in a gas tight manner, the upper end of said first body being fixed to the interior of said second body upper portion, said passage means including at least one hole extending completely through the wall of said first body below said second body upper portion but above the midpoint of said second body.

7. The invention as defined in claim 1, wherein said inner tube assembly includes a balance weight fixed to said first body at the lower end thereof, said balance weight being made of a material having a density substantially greater than that of at least one of the other structures fixed relative thereto.

8. The invention as defined in claim 7, wherein said bonnet assembly and said first and second bodies are made of a material having a density substantially less than that of said balance weight.

9. The method of monitoring sulfur compounds, said method comprising the steps of: pumping air through a bubbler submerged in a sample liquid below a bell jar-like structure; collecting the bubbled air in said structure; pumping the collected air from said structure at a rate slower than the same is collected therein; passing said collected air through the cell of a coulometric titrator; and indicating the quantity of reagent dispensed by said titrator.

10. Apparatus for monitoring sulfur compounds, said apparatus comprising: a gas pump having an air inlet at atmospheric pressure and an outlet; first means to bubble air through a sample fluid; second means connected with said first means to collect air bubbled through said sample fluid by said first means; third means connected between said pump outlet and said first means to pass the air output of said pump thereto; a coulometric titrator having an electrolytic cell, said cell having a sample gas inlet and a sample gas outlet; first conduit means connecting said second means with said sample gas inlet to pass said bubbled air thereto; and fourth means connected from said cell sample gas outlet to create a vacuum pressure at said sample gas outlet, said fourth means being adapted to withdraw bubbled air from said second means at a rate less than that at which it collects as determined by the capacity of said pump.

11. The invention as defined in claim 10, wherein said first and second means are fixed relative to each other to form a probe, said probe being floated by a portion of said collected air, said pump having a capacity to pass air to said first means in a quantity sufficient to cause said probe to float.

12. The invention as defined in claim 11, wherein said third means includes a first adjustable valve to meter an adequate amount of air to said first means as aforesaid.

13. The invention as defined in claim 12, wherein said fourth means includes an aspirator having a pressure inlet, a vacuum inlet and an outlet, said aspirator outlet being vented to atmospheric pressure, said aspirator pressure inlet being connected from said pump outlet, said cell outlet being connected to said aspirator vacuum inlet.

14. The invention as defined in claim 13, wherein second conduit means are provided connecting said pump outlet to said aspirator pressure inlet, said first valve being connected from said second conduit means, and a second adjustable valve connected from said second conduit means to atmospheric pressure, said second valve being connected from said second conduit means at a location between the connection of said first valve thereto and the connection of said second conduit means to said aspirator pressure inlet.

15. The invention as defined in claim 10, wherein said fourth means is connected from said pump outlet in a manner to be actuated by the output pressure thereof.

16. The invention as defined in claim 15, wherein said third means includes a first adjustable valve to meter an adequate amount of air to said first means as aforesaid.

17. The invention as defined in claim 16, wherein said fourth means includes an aspirator having a pressure inlet, a vacuum inlet and an outlet, said aspirator outlet being vented to atmospheric pressure, said aspirator pressure inlet being connected from said pump outlet, said cell outlet being connected to said aspirator vacuum inlet.

18. The invention as defined in claim 17, wherein second conduit means are provided connecting said pump outlet to said aspirator pressure inlet, said first valve being connected from said second conduit means, and a second adjustable valve connected from said second conduit means to atmospheric pressure, said second valve being connected from said second conduit means at a location between the connection of said first valve thereto and the connection of said second conduit means to said aspirator pressure inlet.

19. The invention as defined in claim 15, wherein said fourth means includes an aspirator having a pressure inlet, a vacuum inlet and an outlet, said aspirator outlet being vented to atmospheric pressure, said aspirator pressure inlet being connected from said pump outlet, said cell outlet being connected to said aspirator vacuum inlet.

20. Apparatus for passing a gas through a liquid, said apparatus comprising: an enclosing structure, said structure having an inlet opening and an outlet opening through the top thereof; a conduit having its upper end fixed relative to said structure in communication with said inlet opening, said structure and said conduit having a gas tight seal therebetween to seal said inlet opening to said conduit, said conduit extending downwardly inside said structure to a position adjacent its lower end to release a gas inside thereof thereat; and float means fixed to the upper end of said structure in a position to suspend the lower end thereof and the lower end of said conduit in the liquid.

21. The invention as defined in claim 20, including a balance weight fixed to the lower end of said structure, said balance weight being made of a material having a density large in comparison to that of said structure and said float means to keep said structure upright, stable and erect.

22. The invention as defined in claim 21, wherein said structure and said float means are both made substantially of polyethylene, said balance weight being made of stainless steel.

* * * * *